United States Patent [19]

Shiohara

[11] Patent Number: 5,383,530

[45] Date of Patent: Jan. 24, 1995

[54] MOTORCYCLE

[75] Inventor: Masakazu Shiohara, Iwata, Japan

[73] Assignee: Yamaha Hatsudoki Kabushiki Kaisha, Iwata, Japan

[21] Appl. No.: 964,445

[22] Filed: Oct. 21, 1992

[30] Foreign Application Priority Data

Oct. 21, 1991 [JP] Japan .................. 3-302382

[51] Int. Cl.$^6$ ............................................ B62K 25/30
[52] U.S. Cl. ..................................................... 180/227
[58] Field of Search ................. 180/227, 219; 280/275, 280/284, 283

[56] References Cited

U.S. PATENT DOCUMENTS

| 3,937,291 | 2/1976 | Hanagan | 180/227 |
| 4,433,747 | 2/1984 | Offenstadt | 180/227 |
| 4,463,824 | 8/1984 | Boyesen | 180/227 |
| 4,616,729 | 10/1986 | Kasai | 280/284 |
| 4,645,028 | 2/1987 | Kawashima | 180/227 |
| 4,650,026 | 3/1987 | Shiraishi | 180/227 |
| 4,667,762 | 5/1987 | Ishino et al. | 180/227 |
| 4,800,979 | 1/1989 | Tatsuji | 180/227 |
| 5,011,459 | 4/1991 | Van De Vel | 180/227 |
| 5,016,725 | 5/1991 | Muramatsu | 180/227 |

FOREIGN PATENT DOCUMENTS

| 61-205573 | 3/1985 | Japan . |
| 62-43993 | 9/1985 | Japan . |
| 2-123485 | 3/1989 | Japan . |
| 2-231293 | 9/1990 | Japan . |
| 2-256583 | 10/1990 | Japan . |

Primary Examiner—Margaret A. Focarino
Assistant Examiner—Kevin Hurley
Attorney, Agent, or Firm—Knobbe, Martens, Olson & Bear

[57] ABSTRACT

A motorcycle rear wheel suspension and drive arrangement to minimize chain length changes during suspension travel. The driving chain for the rear wheel is driven by a stub shaft carrying a sprocket and the pivot axis for the trailing arm is disposed within the peripheral edges of the sprocket but not aligned with the axis of the stub shaft so that the driving sprocket may be removed without removal of the suspension arm or any of its suspending components.

15 Claims, 5 Drawing Sheets

MOTORCYCLE

BACKGROUND OF THE INVENTION

This invention relates to a motorcycle and more particularly to an improved suspension and driving arrangement for the driven wheel of a motorcycle or motorcycle type of vehicle.

As is well known, motorcycles embody a frame assembly upon which an engine is mounted. In conventional motorcycle practice, the engine crankcase has built into it an integral change speed transmission. This change speed transmission drives the rear wheel through a driving arrangement, quite frequently a chain or the like. The rear wheel, however, is suspended for movement relative to the frame generally by a trailing arm suspension. Thus, the driven wheel will move in an arc relative to the output shaft of the transmission and this can give rise to certain problems, particularly if the pivot axis of the rear wheel suspension is offset to any great degree from the output shaft axis of the transmission.

In order to minimize the difference in chain length as occurs during the suspension movement, it has been proposed to align the transmission output shaft axis with the pivot axis for the rear wheel suspension arm. This, however, gives rise to a number of problems. Specifically, it is quite difficult to position all of the components in a manner so that a compact construction, as is necessary with a motorcycle, can be provided. For example, it has been proposed to use a co-axial arrangement wherein the pivot shaft and output shaft are telescoped one within the other. However, when this is done, then the output shaft tends to become large in diameter to transfer the necessary driving forces and, accordingly, the sprocket wheel or drive element that is affixed to the output shaft also may become large. This causes a number of problems one of which is that it adversely effects the drive ratio between the engine output shaft and the rear wheel since the large sprocket limits the attainable ratios. In addition, it is necessary to provide seals between the respective shafts, particularly in the area where the transmission output shaft passes through the transmission case. Also, it is then necessary to disassemble the entire rear wheel suspension in order to service the driving chain and/or sprocket.

It is a principal object of this invention to provide an improved compact suspension and drive arrangement for a motorcycle rear wheel that is relatively insensitive to suspension travel.

It is, another object of this invention to provide an improved driving and rear suspension arrangement for a motorcycle type of vehicle wherein the pivot axis of the rear wheel suspension and the pivot axis of the transmission shaft are closely positioned to each other but are not directly aligned.

It is a further object of this invention to provide an improved suspension and drive arrangement for a motorcycle rear wheel wherein the driving sprocket for the rear wheel drive can be serviced without necessitating disassembly of the suspension or any components of it.

SUMMARY OF THE INVENTION

This invention is adapted to be embodied in a rear wheel suspension and drive arrangement for a motorcycle type of vehicle comprising a frame assembly mounting a change speed transmission driven by an engine. The change speed transmission includes an output shaft which is rotatable about a fixed first axis and which drives a rear wheel driving element fixed co-axially thereon. A trailing arm rotatably journals a rear wheel thereon and is pivotally connected to the frame for suspension movement about a second axis which extends parallel to the first axis and is positioned longitudinally of the frame in a longitudinal position forwardly of the rear peripheral edge of the rear wheel driving element. Means are provided for driving the rear wheel from the rear wheel driving element.

DETAILED DESCRIPTION OF THE PREFERRED EMBODIMENTS OF THE INVENTION

Figure 1:
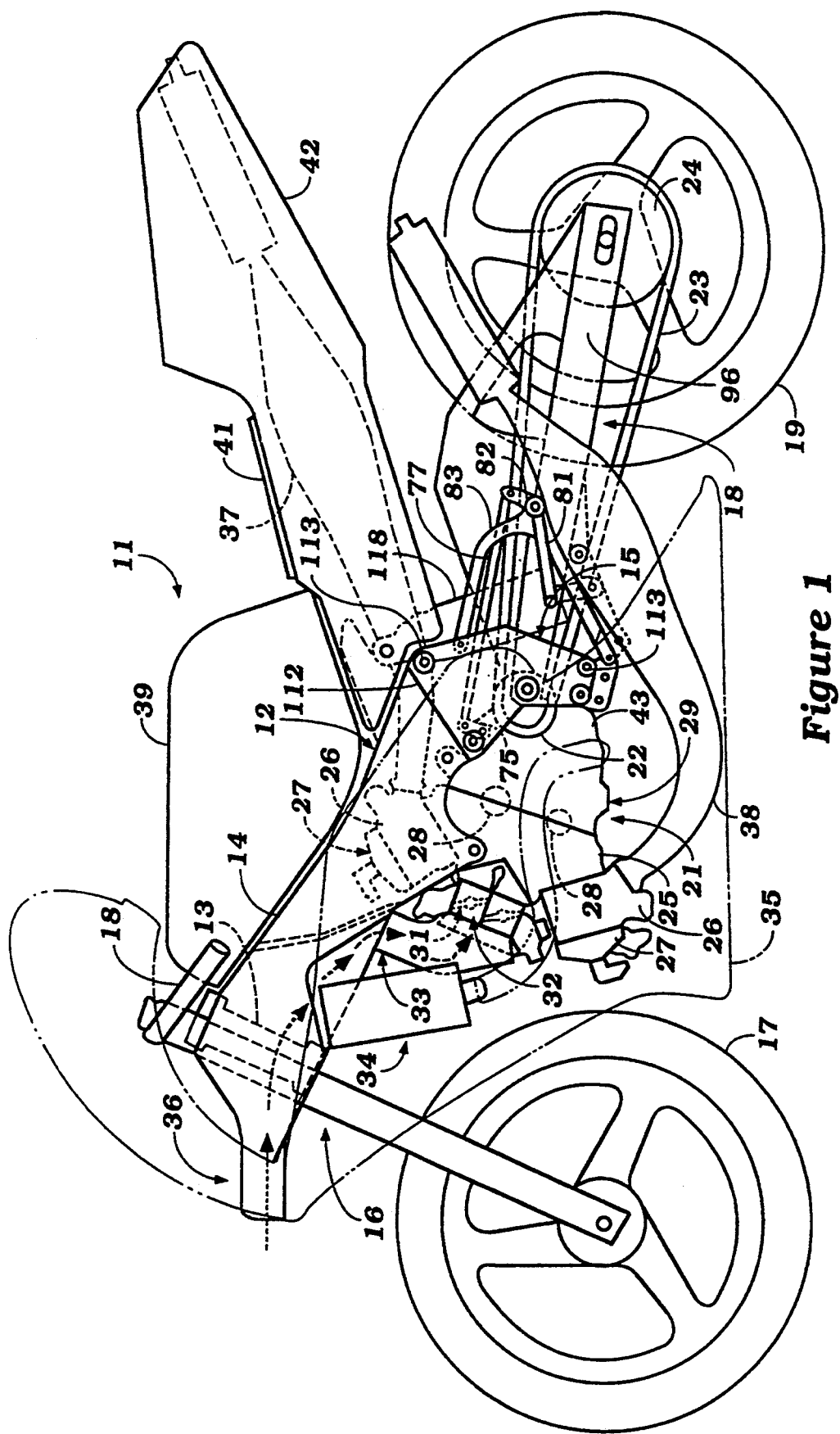
FIG. 1 is a side elevational view of a motorcycle constructed in accordance with an embodiment of the invention.

Referring in detail to the drawings and initially to FIG. 1, a motorcycle constructed in accordance with an embodiment of the invention as identified generally by the reference numeral 11. Although the invention is described in conjunction with a motorcycle, it should be readily apparent to those skilled in the art that the invention may be employed with other types of vehicles which are constructed similarly to motorcycles such as some types of off the road, three and four wheel vehicles which are driven by an engine transmission assembly of the type utilized in a motorcycle. The invention, however, has particular utility in motorcycles.

The motorcycle 11 includes a frame assembly, indicated generally by the reference numeral 12 which is of the welded type and includes a head type 13 from which a pair of rearwardly extending fabricated main frame members 14 extend. These main frame members 14 are connected at their lower rear ends by a rear wheel suspension mounting element 15 which may be formed either as a casting, forging or a weldment.

A front fork 16 is dirigibly supported by the head pipe 13 in a known manner and rotatably journals a front wheel 17 at its lower end. The front fork 16 and front wheel 17 are steered by the means of a handlebar assembly 18 in a known manner. The front fork 16 may include any type of suspension arrangement for permitting suspension movement of the front wheel 17 relative to the frame assembly 12.

A trailing arm assembly, indicated generally by the reference numeral 18 and having a construction of the type which will be described, is pivotally mounted on the rear wheel suspension mounting element 15 in a manner which will also be described. The trailing arm 18 rotatably journals a rear wheel 19 at its rear end.

A combined engine change speed transmission assembly, indicated generally by the reference numeral 21, is mounted in the frame assembly 12 and drives the rear wheel 19 in a manner which will be described. This rear wheel drive includes a driving sprocket 22 which, in turn, drives a chain 23 that drives a driven sprocket 24 that is affixed for rotation with the rear wheel 19.

In the illustrated embodiment, the engine change speed transmission assembly 21 includes a V4 two-cycle crankcase compression internal combustion engine that is comprised of a cylinder block 25 having a pair of cylinder banks one of which is disposed at a slightly downward angle to a horizontal plane and the other of which extends generally in a vertical direction but is inclined slightly forwardly from the vertical. These cylinder banks are indicated by the reference numeral 26 and respective cylinder heads 27 are affixed to each cylinder bank 26.

In the illustrated embodiment, the engine 21 is of the type having a pair of crankshafts 28 each of which is driven by the pistons of the respective cylinder bank and which are geared together, in a manner to be described, so as to drive the transmission which is contained within a combined crankcase transmission assembly 29 of the engine drive arrangement 21.

The engine is provided with an induction system that includes pairs of throttle bodies 31 and 32 which pairs serve the cylinders of the respective cylinder banks 26. Air is delivered to the throttle body 31 and 32 through an air inlet box 33. A body, shown in phantom and identified by the reference numeral 35 encircles a ram air inlet device 36 of the type described in my co-pending application Ser. No. 07/964,196, filed Oct. 21, 1992 and entitled "Wind Introducing System For A Motorcycle", assigned to the Assignee hereof. That disclosure is incorporated herein by reference. This device 36 supplies cool ram air to the air inlet box 33.

The engine 21 is also water cooled and for this purpose a paid of radiators 34 are mounted behind and to the sides of the front fork 16.

The exhaust gases from the engine 21 are discharged to the atmosphere by respective upper and lower exhaust systems 37 and 38 which extend along the upper and lower sides of the frame assembly and which terminate at their rear ends in mufflers having atmospheric discharges.

A fuel tank 39 is mounted on the frame assembly 12 above the engine 21 and forwardly of a seat 41. The seat 41 is carried by a side cover 42 which is affixed in any suitable manner to the frame assembly 12.

The change speed transmission of the crankcase transmission assembly 29 will now be described by detailed reference to FIGS. 2 and 3. It should be noted that the crankcase assembly 25 includes a front member and rear member 43 which form the transmission case. As has been noted, the crankshafts 28 are geared so that they rotate together and this is accomplished by means of a pair of intermeshing gears 44 and 45 which are affixed to the respective crankshafts 28. The gear 45 also is integrally formed with a further gear 46 which, in turn, meshes with a clutch drive gear 47 which forms the input element of a clutch assembly 48. The clutch 48 drives the change speed transmission, aforenoted, which is indicated generally by the reference numeral 49 and which is contained primarily in the rear case 43.

The change speed transmission 49 is of the cassette type and includes a cassette plate 51 that carries a pair of bearings 52 and 53 which are pressed into respective bores 54 and 55 of the cassette plate 51. The cassette plate 51 is affixed in a suitable manner to one side wall 56 of the rear case 43. The mechanism just described is all covered by a cover plate 57 that is affixed to one side of the crankcase transmission assembly 29 in a known manner.

A transmission primary shaft 58 and a transmission secondary shaft 59 are rotatably journaled at one end in the bearings 52 and 53, respectively. The opposite ends of the transmission primary and secondary shafts 58 and 59 are journaled by respective bearings 61 and 62 which are pressed into bores 63 and 64 of the rear case 43.

Pairs of intermeshing gear sets 65 and 66 are mounted on the primary and secondary shafts 58 and 59, respectively and are operated so as to selectively couple them for rotation with the respective shafts so as to drive the secondary shaft 59 at a selected speed ratio from the primary shaft 58. This engagement is achieved by means of pairs of shift forks 67 and 68 which are slidably supported on fork shafts 69 and 71, respectively. These shift forks 67 and 68 are operated by means of a cam drum 72 mounted on a camshaft 73 and which is rotated by a shift shaft. 74 in a well known manner.

Figure 4:
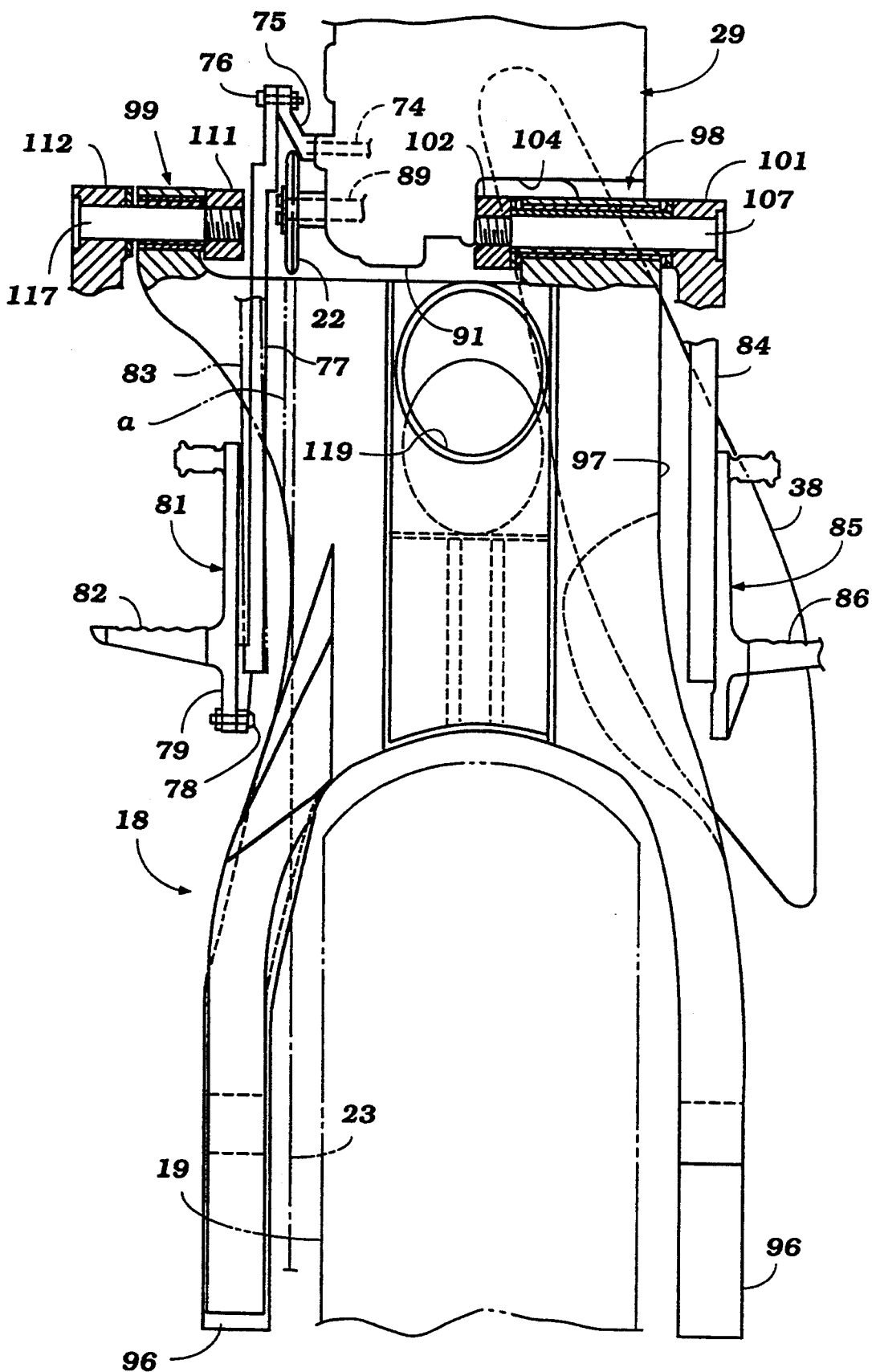
FIG. 4 is a top plan view of the area shown in FIG. 2 but on a smaller scale and with a portion broken away.

The shift shaft 74 is, in turn, operated by a mechanism best seen in FIGS. 1 and 4 and which includes a shift lever 75 that is affixed to the exposed end of the shift shaft 74 and which is connected by means of a pivot pin 76 to one end of a shift link 77. The opposite end of the shift link 77 is connected by a pivot pin 78 to a shift arm 79 of a shift pedal, indicated generally by the reference numeral 81 and which is provided with a footrest 82 by which the operator may pivot the shift pedal 81 and rotate the shift shaft 74 to effect a change in the transmission ratio by actuating the forks 67 and 68.

The shift pedal 81 is pivotally supported on a mounting bracket 83. A similar mounting bracket 84 is positioned on the opposite side of the frame assembly 12 and carries a brake operating lever 85 having a footrest portion 86 for engagement by the operator's foot.

Referring now again primarily to FIGS. 2 and 3, the change speed transmission assembly 49 further includes an output gear 87 which is affixed for rotation with the transmission secondary shaft 59 and which meshes with a gear 88 fixed to a stub shaft 89. The stub shaft 89 is positioned within a rearwardly extending protuberance 91 formed at one side of the rear case 43. This stub shaft 89 is rotatably journaled by a bearing 92 positioned within a bore of the protuberance 91 and a further antifriction bearing 93. The driving sprocket 22 is affixed to the exposed end of the stub shaft 89 by means of a retainer plate 94 which is held in place by means of a plurality of threaded fasteners 95.

Figure 5:
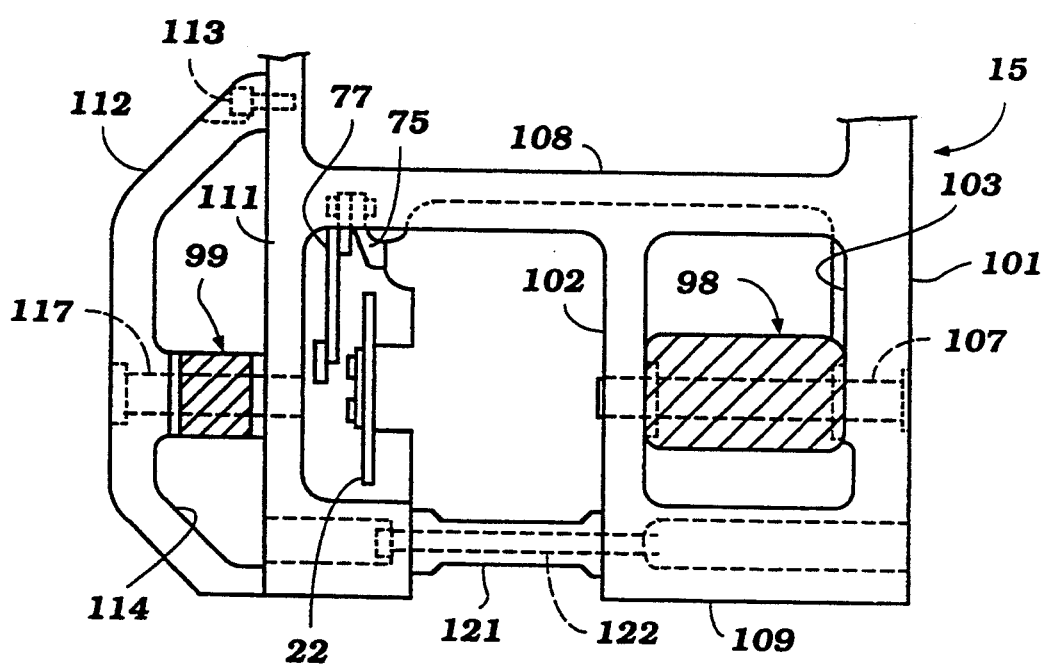
FIG. 5 is a rear elevational view showing the arrangement for pivotally mounting the trailing arm and the associated frame structure.

The support for the trailing arm 18 and its interrelationship to the transmission and specifically the stub shaft 89 and driving sprocket 22 will now be described by primary reference to FIGS. 2, 4 and 5. As may be seen, the trailing arm 18 has a bifurcated shaped comprised of a pair of side members 96 that extend along opposite sides of the rear wheel 19 and which are joined at their forward ends by a base portion 97. This base portion 97 has at its forward end a pair of journal portions 98 and 99 which terminate at a point which is disposed longitudinally within the outer peripheral edges of the driving sprocket 22, for a reason which will become apparent.

It should be noted that the portion 98 has substantially greater transverse width than the portion 99 and that the portion 98 extends generally in the area adjacent the transmission case protuberance 91 where the stub shaft 89 is journaled. It will also be noted from an inspection of FIG. 5, that the rear wheel suspension member 15 has a first side portion 101 and an intermediate portion 102 that define a cavity 103 into which the journal portion 98 extends. This portion is formed slightly rearwardly of a rear face 104 of the transmission case 43. An anti-friction bearing 105 and bushing 106 are placed within a bore of the journal portion 98 and receive a pivot bolt 107 which is fixed suitably in the portion 101 and 102 of the rear suspension member 15 so as to provide pivotal support for this side of the trailing arm 18.

The cavity 103 in addition to being defined by the side portion 101 and intermediate portion 102 is defined by an upper cross portion 108 and a lower cross portion 109. The lower cross portion 109 is shorter than the upper cross portion 108 and the upper cross portion 108 is integrally connected to a further side member 111 that is disposed inwardly of the journal portion 99 of the other side of the trailing arm 18. A further piece 112 is affixed to the side piece 111 by a plurality of threaded fasteners 113 and defines a cavity 114 into which the journal portion 99 extends.

Like the journal portion 98, the journal portion 99 has a bore that receives an anti-friction bushing 115 and a sleeve 116. A pivot bolt 117 extends through the sleeve 116 and is affixed to the member 112 and the side member 111 in any suitable manner so as to provide the forward pivot for this side of the trailing arm 18.

Figure 2:
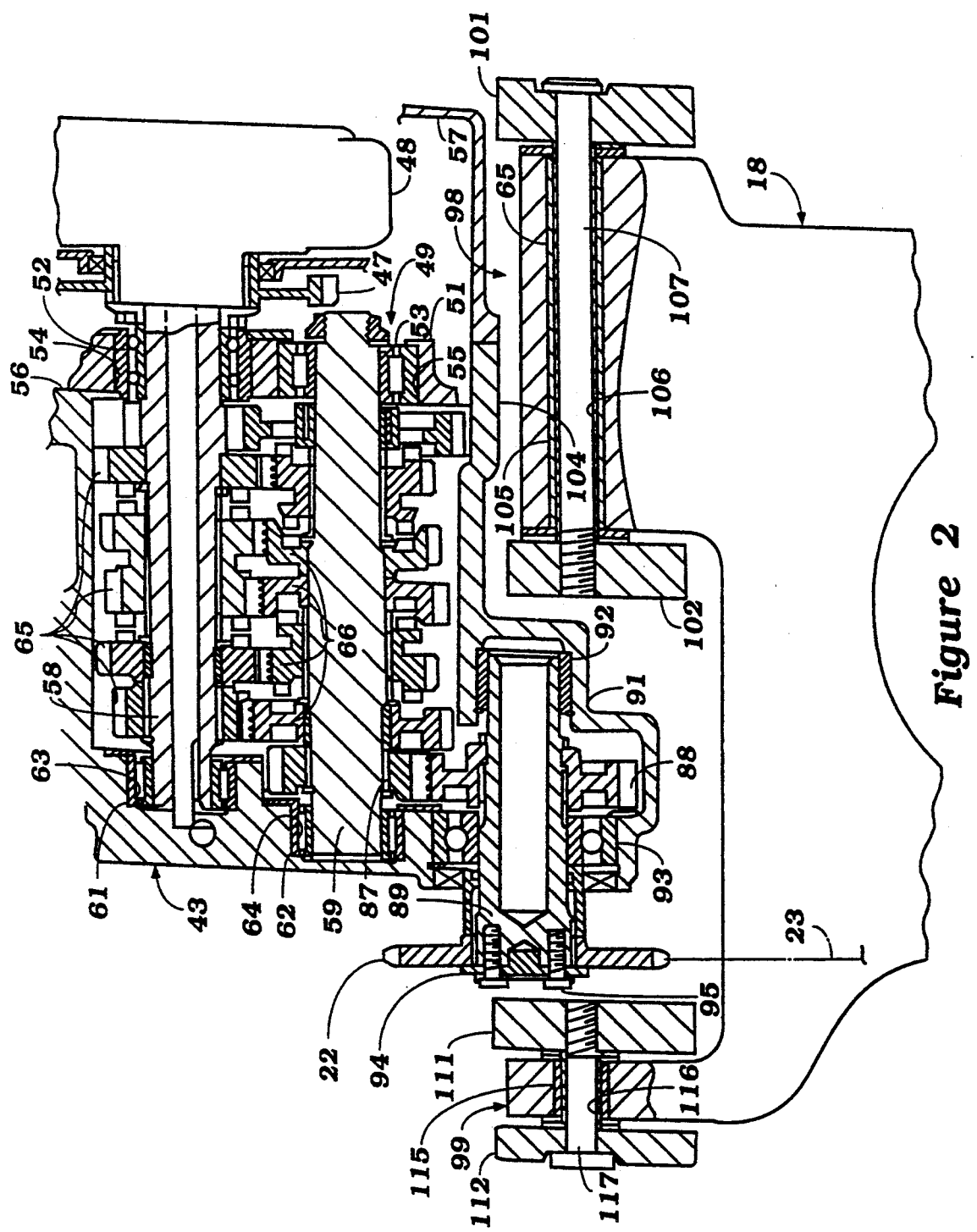
FIG. 2 is an enlarged cross sectional view taken through a portion of the change speed transmission and the pivot support for the rear wheel suspension arm.
Figure 3:
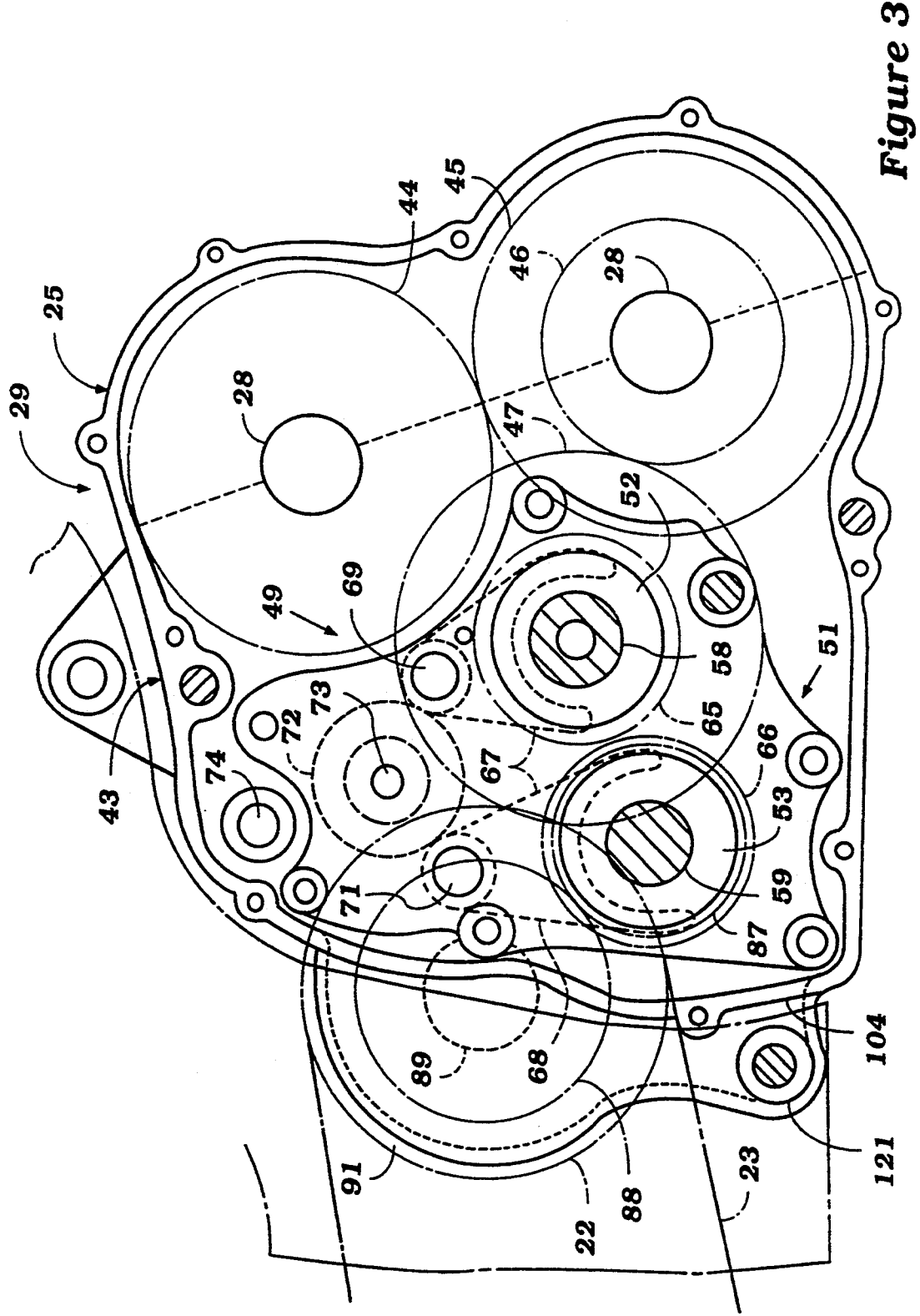
FIG. 3 is a side elevational view of the change speed transmission with one of the cover plates removed.

It should be noted from FIG. 2 that the pivot axis defined by the pivot bolts 107 and 117 is not aligned with the rotational axis of the stub shaft 89 but their pivot axes are aligned and within the outer periphery of the sprocket 22 so that there will be minimum chain length changes during suspension travel. In addition, the configuration is such that the sprocket 22 may be easily removed without removing the rear suspension by removing the threaded fasteners 95 and retainer plate 94 and then sliding the sprocket 22 off of the stub shaft 89.

In the illustrated embodiment the trailing arm 18 has been suspended at both sides of the frame assembly by the journal portions 98 and 99 although, as has been noted, the journal portion 98 is considerably longer than the journal portion 99. If desired, the journal portion 99 could in fact deleted and if this is done, then the trailing arm 18 becomes more compact as shown by the phantom line "a" in FIG. 4. In that event, the sprocket 22 is readily accessible and is not obscured by any bearing. As has been noted, however, the sprocket 22 can be easily removed even if the journal portion 99 is employed.

In the illustrated embodiment, also, the pivot axes defined by the pivot pins 107 and 117 are positioned to the rear of the axis of the transmission stub shaft 89 but it is to be understood that the pivot axis of the trailing arm 18 may be positioned forwardly of this axis, if desired. However, the pivot axes 107 and 117 should lie within the outer periphery of the sprocket wheel 22, for the reasons as aforenoted.

The suspension travel of the rear wheel 19 and trailing arm is dampened by a combined spring and shock absorber unit 118 (FIG. 1) that is positioned in part in an opening 119 of the trailing arm base portion 97. This suspension element 118 is loaded by means of any suitable linkage system as the rear trailing arm 18 pivots.

For mounting of the engine transmission assembly 21 in the frame, the rear case 43 may be formed with a boss 121 (FIGS. 3 and 5) that extends between the rear suspension member portions 111 and 102 and a mounting bolt 122 may extend there through and be fixed to the rear suspension member 15 for partial mounting of the engine transmission assembly 21.

It should be readily apparent from the foregoing description that the described rear wheel drive and suspension mechanism permits a very robust suspension for the rear wheel and also one which will minimize chain length changes during suspension travel without interfering with the serviceability of the components. Specifically, the driving sprocket can easily be replaced without removal of any of the suspension components. In addition, the construction does not dictate the size of the driving sprocket or the drive shafts and thus a greater design latitude is permitted. Of course, the foregoing description is that of preferred embodiments of the invention and various changes and modifications may be made without departing from the spirit and scope of the invention, as defined by the appended claims.

I claim:

1. A rear suspension and drive arrangement for a motorcycle type of vehicle comprising a frame assembly mounting a change speed transmission driven by an engine, said change speed transmission including an output shaft rotatable about a first axis and driving a rear wheel driving element fixed co-axially thereto, a trailing arm rotatably journaling a rear wheel thereon, means for pivotally mounting said trailing arm upon said frame assembly for suspension movement about a second axis parallel to said first axis and positioned longitudinally of said frame in a position forwardly of the rear peripheral edge of said rear wheel driving element and rearwardly of the forward peripheral edge of said rear wheel driving element so that a portion of said trailing arm overlies said rear wheel driving element, said overlying portion being spaced transversely from said rear wheel driving element sufficiently to permit removal of said rear wheel driving element from said output shaft when said trailing arm is in position mounted upon said frame assembly, and means for driving said rear wheel from said rear wheel driving element.

2. A rear suspension and drive arrangement as set forth in claim 1 wherein the rear wheel driving element comprises a sprocket and the means for driving the rear wheel comprises a flexible transmitter driven by said sprocket.

3. A rear suspension and drive arrangement as set forth in claim 2 wherein the second axis is not co-axial with the first axis.

4. A rear suspension and drive arrangement as set forth in claim 3 wherein the means for pivotally mounting the trailing arm is independent of and a separate element from the output shaft.

5. A rear suspension and drive arrangement as set forth in claim 4 wherein the trailing arm is supported by a pair of spaced apart pivot shafts.

6. A rear suspension and drive arrangement as set forth in claim 2 wherein the sprocket is affixed to the output shaft by threaded fastening meanings accessible and removable when the trailing arm is in position.

7. A rear suspension and drive arrangement as set forth in claim 1 wherein the means for pivotally mounting the trailing arm is independent of and a separate element from the output shaft.

8. A rear suspension and drive arrangement as set forth in claim 1 wherein the frame assembly comprises a head pipe dirigibly supporting a front wheel assembly, a pair of main frame members affixed to said head pipe and extending rearwardly and downwardly therefrom, and a rear wheel suspension member affixed to the rear ends of said main frame members and pivotally supporting said trailing arm.

9. A rear suspension and drive arrangement as set forth in claim 8 wherein the rear wheel suspension member defines a cavity on a side opposite to the side of the frame assembly where the rear wheel driving element is positioned and wherein the trailing arm has a portion extending into and pivotally supported within said cavity.

10. A rear suspension and drive arrangement as set forth in claim 9 wherein the rear wheel supporting member further defines a second cavity on the side of the frame assembly where the rear wheel driving element is located and wherein the trailing arm has a second portion extending within said second cavity and pivotally supported therein.

11. A rear suspension and drive arrangement as set forth in claim 10 wherein the second cavity is defined in part by a removable member of the rear wheel suspension member.

12. A rear suspension and drive arrangement as set forth in claim 11 wherein the removable member is disposed outwardly of the rear wheel driving element.

13. A rear suspension and drive arrangement as set forth in claim 12 wherein the rear wheel driving element comprises a sprocket and the means for driving the rear wheel comprises a flexible transmitter driven by said sprocket.

14. A rear suspension and drive arrangement for a motorcycle type of vehicle comprising a frame assembly mounting a change speed transmission driven by an engine, said change speed transmission including an output shaft rotatable about a first axis and driving a rear wheel driving element fixed co-axially to said output shaft on one side of said change speed transmission, a trailing arm rotatably journaling a rear wheel thereon, means for pivotally mounting said trailing arm upon said frame assembly for suspension movement about a second axis parallel to said first axis and positioned longitudinally of said frame in a position forwardly of the rear peripheral edge of said rear wheel driving element comprising a single pivot shaft positioned on the side of said change speed transmission opposite said rear wheel driving element, and means for driving said rear wheel from said rear wheel driving element.

15. A rear suspension and drive arrangement as set forth in claim 14 wherein the output shaft is a stub shaft positioned at one side of a transmission case of the change speed transmission and wherein the means for pivotally supporting the trailing arm comprises a pivot bushing for the single pivot shaft located within a recess formed in the other side of said transmission case.

* * * * *